Oct. 15, 1968  P. A. G. LEPELLETIER  3,405,978
DYNAMIC PRESSURE CONVERTER
Filed Oct. 23, 1967  4 Sheets-Sheet 1

INVENTOR
PIERRE ANDRE GEORGES LEPELLETIER
By Young + Thompson
ATTYS.

United States Patent Office 3,405,978
Patented Oct. 15, 1968

3,405,978
DYNAMIC PRESSURE CONVERTER
Pierre André Georges Lepelletier, Chatou, France, assignor to Societe Anonyme Francaise du Ferodo, Paris, France, a corporation of France
Filed Oct. 23, 1967, Ser. No. 677,419
7 Claims. (Cl. 303—22)

ABSTRACT OF THE DISCLOSURE

A dynamic pressure converter, especially applicable to braking systems of automobile vehicles, comprising a piston which defines two chambers in a hollow body, one chamber being coupled to the braking circuit, the other to a hydraulic control source, said piston comprising a rod subjected to a variable orientated axial force which is a function of the oscillation of the vehicle chassis with respect to a non-suspended point of the chassis, said piston further comprising, between the two chambers and for the regulation at rest of the piston in thrust, in floating equilibrium or in traction, a controlled communication comprising a ball valve actuated towards opening in opposition to a restoring spring, by a finger fixed to an auxiliary piston slidably mounted in a bore and moving in opposition to elastic means.

---

Dynamic pressure converters which are particularly applicable to braking devices for automobile vehicles are already known, of the kind comprising a hollow body provided with at least two bores and a piston of section S1, known as the main piston, having an axial rod with a section S2. In a dynamic pressure converter of this type, described in patent application No. 607,179, now U.S. Patent 3,379,479, filed on Jan. 4, 1967 by the present applicant, the said piston slides in one of the said bores of the hollow body and thus forms on each side a cylindrical chamber coupled to a utilization circuit such as a braking circuit, and round its rod, an annualr chamber coupled to a hydraulic control source such as a master cylinder; the said piston rod slides in a second bore of the hollow body and is subjected to a variable orientated axial force F which is sometimes positive, sometimes negative and sometimes zero, for example a force which is a function of the oscillation of the chassis of the vehicle with respect to a non-suspended point of the said vehicle; and the piston is provided with a controlled communication established between the said chambers for the purpose of isolating or causing these chambers to communicate with each other.

By virtue of this arrangement which in practice is applied to the braking circuit associated with the rear axle of a vehicle, the braking control of this axle is effected following a number of distinct stages of operation, this stepping of the operation enabling the representative curve of pressure applied to the rear axle as a function of the pressure applied to the front axle, to follow most closely the ideal theoretical curve.

It is well known that the ideal theoretical curve of braking torques has a parabolic form which is again found for the braking pressures from the moment when the pressure-torgue response of the brakes of the two front and rear axles is clearly defined, that is to say constant or subject only to small variations. Such a dynamic pressure converter is thus advantageously applicable to brakes of this kind so that it effectively constitutes a real dynamic torque converter.

In addition, it is also known from the patent application referred to above that the force F applied to the piston of the dynamic pressure converter, irrespective of the stage of operation, is a function of the dynamic load on the rear axle, that is to say a function of the static load on this axle and of the instantaneous variations of this load resulting from the various accelerations to which the vehicle is subjected at any given instant due for example to a braking action, to an uphill or downhill gradient in the road, to a bend or to an approach to a bend.

This force F can thus be either positive or negative, depending on whether the dynamic load on the rear axle is more or less large, with a neutral point at which it passes through zero.

In particular, during a braking action when empty and with high decelerations at which the load carried by the rear axle reaches its lowest value, the force F is negative and applies a tractive pull on the piston of the dynamic pressure converter, which results in a reduction of the pressure in the braking circuit of this rear axle, and thereby prevents any dangerous locking of this axle.

A dynamic pressure converter of this kind thus works in all cases like a pressure-reducing device, but the particular feature which consists of acting both in traction and in thrust, together with the splitting-up of the operation into a number of stages, considerably increases its range of use as compared with previously-known types of pressure converters, especially by reason of the fact that it is possible to have operating curves located below the representative curve of operation of the pressure-reducer, corresponding to a zero axial force on the piston rod, since this is precisely the object of the reversal of sign of this force.

In the patent application referred to above, it has further been indicated that the regulation of the system is preferably such that, as long as the vehicle does not apply any braking action, the force F urges the piston of the dynamic pressure converter into abutment against the hollow body in a positive direction of thrust, for which the controlled communication which connects together the two chambers of the hollow body is actuated in the direction of opening.

On the other hand, during braking, as soon as the piston of the pressure converter has moved by a predetermined amount from its extreme position of adjustment, the controlled communication is operated in the direction of closure so that the rate of variation of the pressure downstream of the pressure converter, or converted pressure, is from that time less than the rate of variation of the pressure on the upstream side of this converter, or driving pressure, in a ratio which is a function of the relative sections, of the various bores.

During the development of a dynamic pressure converter of this kind, it has in fact proved that it may be also advantageous, in a certain number of cases, to have for regulation a floating equilibrium of the piston of the pressure converter or even a tractive pull on its rod. The present invention has especially for its object to provide the possibility of such a regulation of the piston in thrust, in floating equilibrium or in traction. There may be chosen for example the case of a floating equilibrium of the piston as a condition of regulation of the apparatus, this regulation being for example effected when the vehicle is empty, at rest, and with a full tank, such conditions being readily obtained in a garage and being known hereinafter as the reference weight.

The invention has also for its object a pressure converter permitting a maximum utilization of the rear brakes, irrespective of the conditions of load of the vehicle, and especially when empty and subjected to small decelerations.

According to the invention, a dynamic pressure converter of the kind referred to above is characterized in that the controlled communication which it comprises includes a ball valve actuated in the direction of opening against a restoring spring by a finger rigidly fixed to an auxiliary piston slidably mounted in an auxiliary bore and acting in opposition to elastic means. In this way, if the regulation as above defined is effected in floating equilibrium or even in traction, the auxiliary piston, urged by its elastic means, follows the corresponding displacement of the main piston and in consequence the controlled communication is maintained open in such manner that at rest the downstream circuit remains in communication with the upstream circuit.

Also according to the invention, the elastic means associated with the auxiliary piston are chosen to be sufficiently powerful to cause the rear brakes in particular to operate, even when the vehicle is empty and at small decelerations, and thus to distribute to the best advantage the wear of the linings of the rear brakes and the front brakes, but nevertheless having a power insufficient to risk any premature locking of the rear brakes on a ground of low coefficient of adhesion, of the order of 0.2 for example.

According to a particular form of embodiment of the invention, the hollow body of the dynamic pressure converter is carried by a non-suspended part of the vehicle, while the rod of the main piston is coupled to the chassis of the vehicle through the intermediary of elastic means which, according to a main characteristic feature, are of variable flexibility.

The characteristic features and advantages of the invention will further become apparent from the description which follows below of a form of embodiment, given solely by way of example and not in any limitative sense, reference being made to the accompanying drawings, in which.

Figure 1:
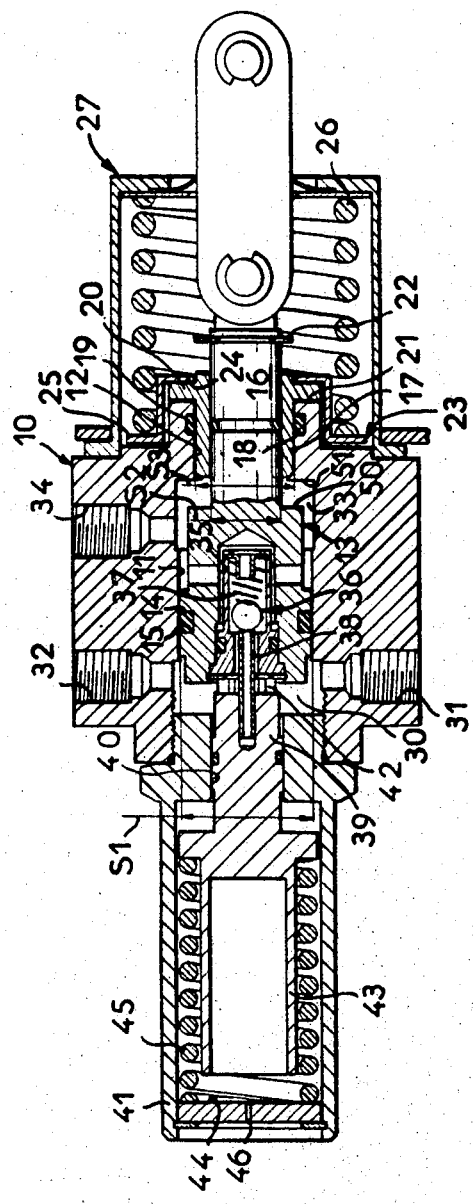
FIG. 1 is a view in axial section of the pressure converter according to the invention, the parts of which are shown in the position which they occupy during the regulation by floating equilibrium of the piston at the reference weight.

The dynamic pressure converter shown in FIG. 1 comprises a body 10 in which are formed two axial bores 11 and 12 having respectively sections S1 and S3 and located successively in the line of extension of each other, the section S3 being less than the section S1.

In the body 10 is arranged a piston 13 comprising a first cylindrical bearing surface 14, or piston proper, slidably mounted in the bore 11, fluid-tightness being ensured by a joint 15, and a second cylindrical bearing surface 16 forming a rod of section S2 less than the section S3 of the bore 12 of the body 10. This rod 16 is enclosed by a ring 17 sliding with easy friction between the rod 16 of the piston 13 and the bore 12 of the body 10, the fluid-tightness of this assembly being ensured by sealing joints 18 and 19.

The ring 17 is provided at one extremity with an annular collar 20 intended to come into abutment against a shoulder 21 of the body 10 and can also come into abutment against a circlips 22 carried by the rod 16 of the piston 13.

The collar 20 of the ring 17 also serves as a support for a sleeve 23 provided for that purpose at one extremity with a transverse collar 24 directed towards the interior of the sleeve 23. The latter is also provided at its other extremity with a transverse collar 25, directed towards the exterior and serving as a support for a calibrating spring 26 mounted in a chamber 27 rigidly fixed to the body 10. This chamber 27 is at atmospheric pressure.

The bearing surface 14 of the piston 13 forms in the bore 11 of the body 10, on the one hand a chamber 30 to which are coupled conduits 31 and 32 connected to the braking device of the rear axle of the vehicle, and on the other hand, conjointly with the rod 16 and the ring 17, a chamber 33 to which is coupled the conduit 34 connected to the master-cylinder of the vehicle or to the hydraulic control source.

The chambers 30 and 33 communicate with each other through a passage 35 formed in the piston 13, on which passage is interposed a valve 36 urged towards the closed position by a spring 37 and to the open position by a finger 38 carried by an auxiliary piston 39. This latter slides in an auxiliary bore 40 formed in a plug 41 fixed on the body 10.

On each of its transverse faces which is opposite the piston 13, or main piston, the auxiliary piston 39 is provided with feet 42, intended to permit the flow of circulating fluid between these pistons when they are in abutment against each other; on the other of its transverse faces, the piston 39 has an extension 43 intended to come into abutment against the bottom 44 of the plug 41. This extension 43 is enclosed by a spring 45 which is supported on the one hand against the piston 39 and on the other against the bottom 44 of the plug 41. A drilled hole 46 puts the internal volume of the bore 40 to the rear of the piston 39 to atmospheric pressure.

Figure 4:
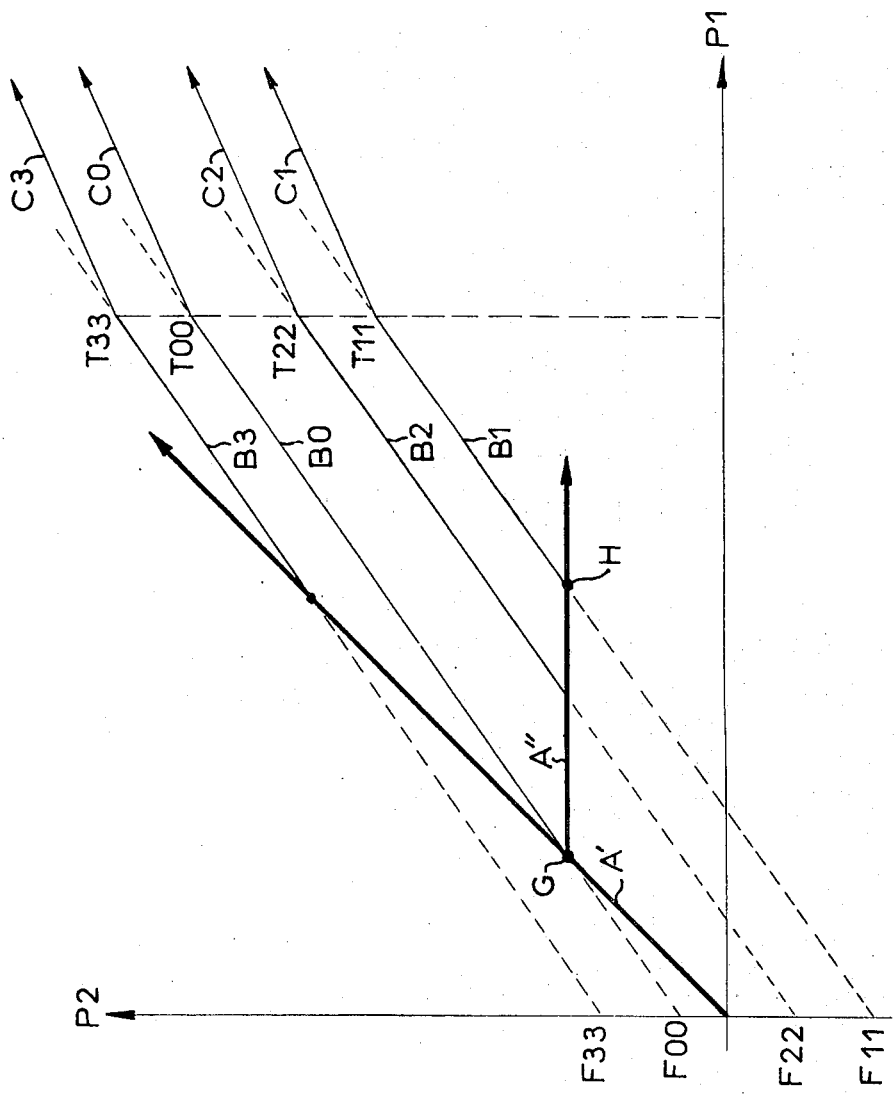
FIG. 4 is a diagram illustrating the operation of this dynamic pressure converter.

The operation of this dynamic pressure converter will be better understood by reference to the diagram shown in FIG. 4. In this diagram, the pressures P1 in the chamber 33 have been plotted in abscissae and the pressures P2 in the chamber 30 as ordinates; that is to say on the one hand the control pressure applied by master cylinder as a result of an action on the brake pedal, the vehicle being stationary, and on the other hand the converted pressure transmitted by the pressure converter to the braking circuit associated with the rear axle of the vehicle.

It will be assumed that when the vehicle is at its reference weight, that is to say for example at rest with the tank full, the regulation of the dynamic pressure converter, effected as will be explained later, is such that piston 13 is in floating equilibrium between the calibration of the spring 45 which is transmitted to it by the auxiliary piston 39 on the one hand, and on the other hand, an equal force applied to the rod 16 by the coupling provided with the chassis. Thus, the auxiliary piston 39, urged by the spring 45, is in application against the main piston 13 by its feet 42, and the valve 36 is actuated towards opening by the finger 38 carried by the said auxiliary piston 39 (FIG. 1) thus putting the upstream and downstream circuits into communication.

If, the vehicle being at rest, an action is applied to the brake pedal (not shown), the pressure P1 increases in the chamber 33. The pressure P2 in the chamber 30 first of all remains the same as the pressure P1, since the valve 36 is open, and increases with it. In FIG. 4, this stage of operation is represented by a straight line A' at 45° starting from the origin. However, when the pressure applied on the auxiliary piston reaches a value sufficient to counterbalance the spring 45, the two pistons separate, the auxiliary piston 39 moving back towards the left, and at a certain moment the valve 36 closes and encloses in the chamber 30 the circuit of the rear brakes a clearly-determined volume of oil. The piston 13 then follows the piston 39 in this displacement with a certain delay in proportion to the difference of the sections of the bore 40 and the section S1. This displacement is effected up to the abutment of the tail 43 of the piston 39 against the bottom 44 of the plug 41 and during the course of this displacement the pressures P1 and P2 remain constant or vary very slightly due to the stiffness of the elastic means concerned.

From this moment (point G in FIG. 4), as the chambers 30 and 33 are no longer in communication, the rates of increase in pressure are in the ratio of the sections $$\frac{S1-S2}{S1}$$

The point illustrating this stage of operation then follows a straight line B0, the slope of which is given by said ratio of sections $$\frac{S1-S2}{S1}$$

the ordinate F00 at the origin of this straight line corresponding to the load on the rear axle, vehicle stationary at the reference weight, that is to say in this case corresponding to the calibration of the spring 45.

Figure 2:
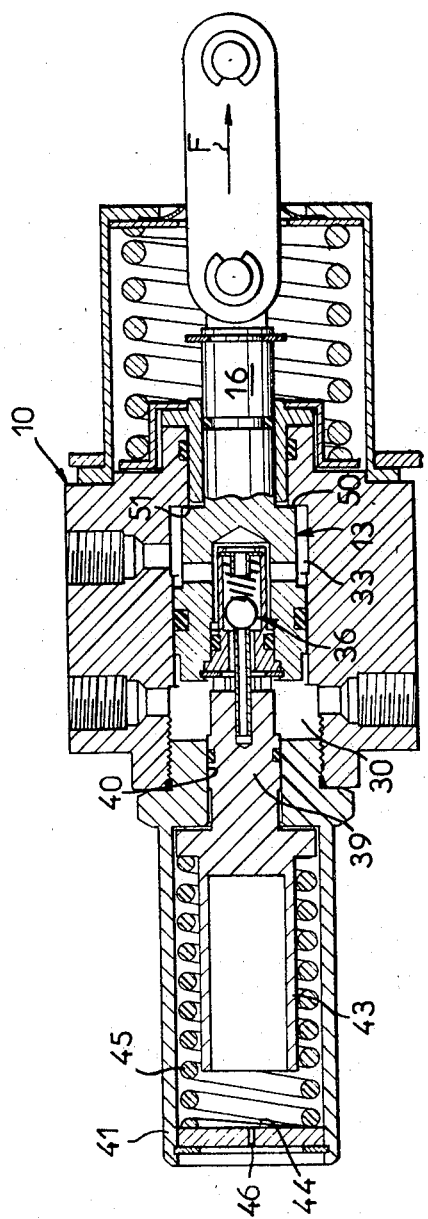
FIGS. 2 and 3 are respectively views similar to FIG. 1, the parts being shown in the position which they occupy for two different weighings of the reference weight corresponding to FIG. 1.

In FIG. 2, it has been assumed that the same vehicle is more lightly loaded at the rear, for example with the tank empty, and that therefore a tractive pull is applied to the rod 16. In consequence, the piston 13 at rest in the body 10 occupies a position in which the outer face 50 of its shoulder is in contact with the bottom 51 of the body 10. The auxiliary piston 39 is held applied against the piston 13 by the spring 45, and in consequence the valve 36 is open.

The operation with the vehicle stationary is as follows:

If an action is effected on the brake pedal (not shown), the pressure P1 increases in the chamber 33, the pressure P2 in the chamber 30 remains the same as the pressure P1, since the valve 36 is open. In FIG. 4, this stage of operation is represented by the straight line A' at 45° starting from the origin.

However, when the pressure applied on the auxiliary piston 39 reaches a value sufficient to counter balance the spring 45, the auxiliary piston 39 moves back towards the left and at a certain moment the valve 36 closes, and if the pressure P1 continues to increase, the pressure P2 remains constant since the auxiliary piston 39 can still move back in its bore 40, the piston 13 being held back towards the right by the coupling to the chassis.

This stage of operation is shown in FIG. 4 by the horizontal line A" which, if so desired, need not be strictly horizontal if the spring 45 has a substantial strength. It continues until the pressure P1 succeeds in overcoming the traction force applied by the coupling to the chassis, at the point H in the drawing. At this moment, the piston 13 moves towards the left.

As the closure of the valve has isolated a well-determined volume of oil, the displacement of the piston 13 causes a more rapid displacement of the piston 39 in the proportion of the sections, until the extension 43 of the auxiliary piston 39 comes into abutment against the bottom 44 of the plug 41. From then onwards, the representative curve of operation is a straight line B1, the slope of which is given by this ratio of sections $$\frac{S1-S2}{S1}$$

the oridinate F11 at the origin of this straight line corresponding to the condition of load of the rear axle, with the vehicle stationary at the corresponding weight.

If this load condition were different, F22 for example, the point illustrating this stage of operation would then follow a straight line B2 parallel to the straight line B1.

It should be observed that since the ordinate of the horizontal portion A" is a function of the value of the calibration of the spring 45, this latter can be chosen sufficiently powerful so as to actuate in particular the rear brakes, even when the vehicle is empty and at low decelerations, and thus distribute to the best advantage the wear of the linings of the rear brakes and the front brakes, while at the same time the spring is not sufficiently powerful to risk any premature locking of the rear brakes on ground having a low coefficient of adhesion, of the order of 0.2 for example.

Figure 3:
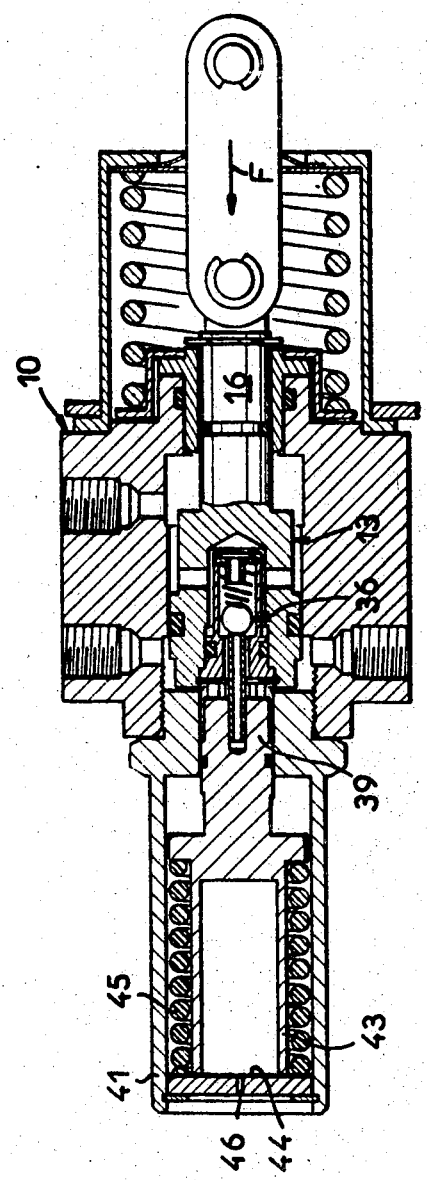

In FIG. 3 it has been assumed that the vehicle is more heavily loaded at the rear; thus, the rod 16 receives a thrust greater than the calibration of the spring 45, and in consequence the pistons 13 and 39 occupy at rest in the body 10 a position for which the piston 13 is in abutment against the piston 39, the extension 43 of which is in turn in abutment against the bottom 44 of the plug 41. The valve 36 is held open in this position.

The operation is then represented, with the vehicle stationary, by the curve A'—B3, B3 being a straight line with a slope $$\frac{S1-S2}{S1}$$

and having an ordinate F33 at the origin corresponding to the load condition of the rear axle when stationary at the corresponding weight.

In all cases, and irrespective of the initial regulation of the apparatus, the operation comprises an additional stage, apart from those which have just been described. In fact, if the user accentuates his action on the brake pedal, the pressure in the chamber 33 increases and there arrives a moment (point T00 or T11 or T22 or T33, FIG. 4) at which it is sufficient for the corresponding force applied to the ring 17 to exceed the pre-stress of the calibration spring 26 and thereby to cause a displacement of the ring 17 towards the right until this ring comes into abutment against the circlip 22 carried by the piston rod 16.

During the course of this last stage, the rates of increase in pressure in the chambers 30 and 33 are determined in accordance with a new ratio of sections $$\frac{S1-S3}{S1}$$

which is less than the previous ratio.

The corresponding representative straight line is the line C0 or C1 or C2 or C3 having a smaller slope than the straight line B0 or B1 or B2 or B3, and of which the ordinate at the origin differs from that of the straight line B0 or B1 or B2 or B3 by an amount which is a function of the calibration spring 26.

It should be noted that the transition points T00, T11, T22, T33 are located on the same vertical line, the position of which depends on the calibrating spring 26. The variations of stress of this latter during the course of the subsequent movement of the piston are assumed to be negligible.

The sections of the auxiliary piston 39 and the rod 16 are advantageously chosen equal to each other, this arrangement making it possible to have an apparatus in which the volumetric capacity is independent of the various positions which its moving members occupy at rest.

As will have been readily understood, the presence of the ring 17 is not essential. In the absence of such a ring, the operation is represented only by the straight lines A', A", B0, B1, B2 and B3, these latter being extended beyond the points T00, T11, T22, T33 (which then no longer exist) as has been shown diagrammatically in broken lines in FIG. 4.

What I claim is:

1. A dynamic pressure converter, especially applicable to braking systems of automobile vehicles, of the kind comprising a hollow body provided with at least two bores, and a piston of section S1, known as the main piston, provided with an axial rod with a section S2, said piston being adapted to slide in one of said bores and defining, on one side thereof, a cylindrical chamber coupled to a utilization circuit such as a braking circuit and, around its rod, an annular chamber coupled to a hydraulic control source such as a master cylinder, said rod, which slides in a second bore of said hollow body, being subjected to a variable orientated axial force F which is sometimes positive, sometimes negative and sometimes zero, such as a force which is a function of the oscillation of the chassis of said vehicle with respect to a non-suspended point of the vehicle, and said piston comprising a controlled communication established between said chambers, said controlled communication comprising a ball valve actuated in the direction of opening, in opposition to a restoring spring, by a finger rigidly fixed to an auxiliary piston slidably mounted in a bore and moving in opposition to elastic means.

2. A dynamic pressure converter as claimed in claim 1, in which the bore in which said auxiliary piston slides is in communication with the atmosphere at the rear of said auxiliary piston.

3. A dynamic pressure converter as claimed in claim 1, in which the size of the section of the bore in which the auxiliary piston slides is in the vicinity of the size of section S2 of the axial rod of the main piston, and is preferably equal to said section.

4. A dynamic pressure converter as claimed in claim 1, characterized in that the hollow body of said converter is carried by a non-suspended part of the vehicle, while the rod of said main piston is coupled to the chassis of said vehicle, preferably through the intermediary of elastic means having variable flexibility.

5. A dynamic pressure converter as claimed in claim 4, in which, at the reference weight, said main piston is in floating equilibrium between the calibration of the elastic means associated with said auxiliary piston on the one hand, and the force applied by the chassis of the vehicle on the rod of said main piston on the other.

6. A dynamic pressure converter as claimed in claim 1, in which the calibration of said elastic means associated with the auxiliary piston is chosen to be lower than a value for which there would be a risk of premature locking of the rear brakes on a ground of low coefficient of adhesion, of the order of 0.2 for example.

7. A dynamic pressure converter as claimed in claim 1, in which the bore of section S2 in which the piston rod slides is the internal bore of a ring which is slidably mounted in a bore of section S3, greater than S2, of said hollow body.

References Cited

UNITED STATES PATENTS

| | | | |
|---|---|---|---|
| 3,237,997 | 3/1966 | Kerr | 303—22 |
| 3,329,471 | 7/1967 | Oberthur | 303—22 |

MILTON BUCHLER, *Primary Examiner.*

J. J. McLAUGHLIN, *Assistant Examiner.*